United States Patent [19] [11] 4,195,336
Kalinichenko [45] Mar. 25, 1980

[54] DIGITAL CONTROL DEVICE FOR MULTIPHASE THYRISTOR-PULSE D.C. CONVERTER

[75] Inventor: Anatoly Y. Kalinichenko, Moscow, U.S.S.R.

[73] Assignee: Vsesojuzny Nauchno-Issledovatelsky Institut Vagonostroenia, Moscow, U.S.S.R.

[21] Appl. No.: 907,020

[22] Filed: May 17, 1978

[51] Int. Cl.² ........................................ H02M 7/515
[52] U.S. Cl. .................................. 363/137; 363/96; 363/79
[58] Field of Search .................................. 363/57-58, 363/78-79, 95-96, 135-139; 307/252 N, 252 Q, 269

[56] References Cited
U.S. PATENT DOCUMENTS

| 3,364,413 | 1/1968 | Abraham | 363/96 |
| 3,792,339 | 2/1974 | Kublick | 363/135 |
| 3,919,621 | 11/1975 | Wechsler | 363/57 |
| 3,940,669 | 2/1976 | Tsuboi et al. | 363/137 X |
| 4,020,360 | 4/1977 | Udvardi-Lakos | 363/79 X |
| 4,105,939 | 8/1978 | Culbertson | 363/137 X |
| 4,122,516 | 10/1978 | Tokunaga | 363/79 |

Primary Examiner—J. D. Miller
Assistant Examiner—Peter S. Wong
Attorney, Agent, or Firm—Lackenbach, Lilling & Siegel

[57] ABSTRACT

The proposed digital device is intended to control a multiphase thyristor-pulse d.c. converter and comprises two decoders, each having as many main outputs as there are phases to that of the connector, and auxiliary outputs which alternate with the main outputs. The device further includes a clock pulse counter whose outputs are connected to inputs of the decoders, and a reversible counter whose add and subtract inputs are connected to outputs of a control unit, outputs of the reversible counter being connected to inputs of the second decoder. The device further includes a NOT gate and an OR gate having all of its inputs connected to an emergency output of a respective phase of the converter an output of said OR gate being connected to an input of the NOT gate. The device further includes two recalculation units, each comprising main AND gates equal in number to the number of phases of the converter, their first inputs being connected to an output of the NOT gate, a second input of each of said AND gates being connected to a respective main output of the respective decoder, and an output of each of said AND gates being connected to a control electrode of a respective thyristor of the respective phase of the converter. Emergency AND gates are divided into groups in a number equal to the number of phases of the converter, the number of said emergency AND gates in each group being equal to the number of auxiliary outputs of the respective decoder. In each group, a first input of each of said emergency AND gates is connected to a respective auxiliary output of the respective decoder. Second inputs of all the emergency AND gates in each group are connected to an emergency output of a respective phase of the converter. A control electrode of a respective thyristor of each of the remaining phases of the converter is connected to an output of a respective emergency AND gate. When operating under emergency conditions, when one of the converter's phases is out of operation, the device provides for equal time intervals between the instants the thyristors of the rest of the converter's phases are driven into conduction.

1 Claim, 13 Drawing Figures

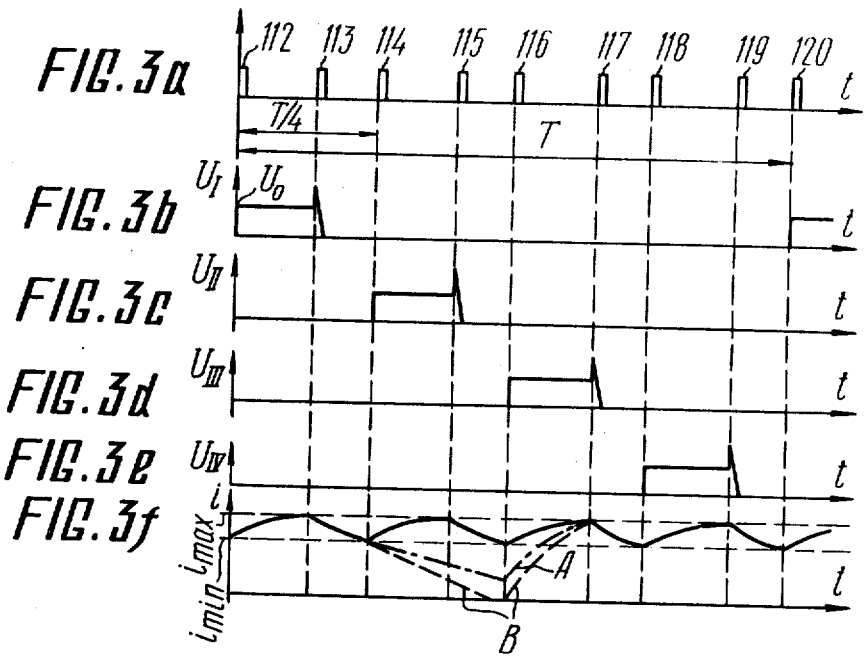
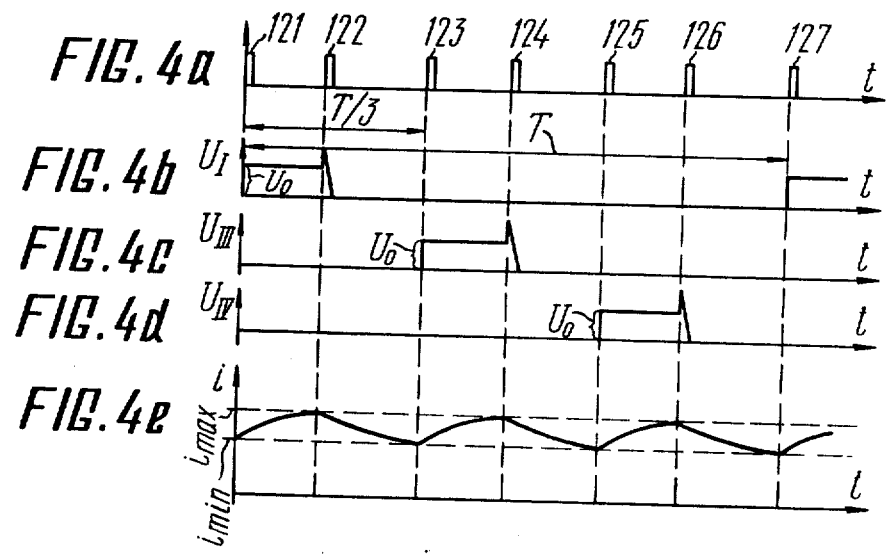

DIGITAL CONTROL DEVICE FOR MULTIPHASE THYRISTOR-PULSE D.C. CONVERTER

FIELD OF THE INVENTION

The present invention relates to means for controlling static converters built of gas-discharge, electronic or semiconductor devices with a control electrode. More specifically, the invention relates to a digital control devices for controlling a multiphase thyristor-pulse d.c. converter.

The device of this invention is applicable to commercial and traction d.c. motors and is intended to control the rotation speed of electrical machines.

DESCRIPTION OF THE PRIOR ART

There is known a digital control device for controlling a multiphase thyristor-pulse d.c. converter. In this device, inputs of two decoders are connected to respective outputs of a clock pulse counter whose input is connected to an output of a master oscillator, other inputs of one of the decoders being connected to outputs of a reversible counter whose add and subtract inputs are connected to outputs of a control unit. Each of the main outputs of said decoder, whose number is equal to the number of the converter's phases, is directly connected to a control electrode of a switching thyristor of a respective phase of the converter. Each of the main outputs of the second decoder, whose number is also equal to the number of the converter's phases, is directly connected to a control electrode of a main thyristor of the same phase of the converter (cf. Transactions of the Dniepropetrovsk Railway Engineers' Institute, Dniepropetrovsk, 1975, Series 163, pp. 21-26).

As one of the phases of the thyristor-pulse d.c. converter is made inoperative, the device under review continues to function under emergency conditions, effecting digital control of the remaining phases of the converter without recalculating time intervals between the instants the thyristors of these phases are driven into conduction.

This affects the operating conditions of the power source of the thyristor-pulse converter, as well as of the electrical machines; this also affects the harmonic content of the current generated by the power source, the harmonics being brought about by power current beats which, in turn, are due to the difference in the time intervals between the instants the thyristors of the converter's different phases are driven into conduction.

SUMMARY OF THE INVENTION

It is an object of the present invention to improve the operating conditions of the power source of the thyristor-pulse d.c. converter and of electrical machines when operating under emergency conditions (with one of the converter's phases rendered inoperative).

It is another object of the invention to maintain, under emergency conditions, a desired harmonic content of the current generated by the power source of the thyristor-pulse converter.

The foregoing objects are attained by providing a digital control device for controlling a multiphase thyristor-pulse d.c. converter, wherein inputs of two decoders are connected to respective outputs of a clock pulse counter whose input is connected to an output of a master oscillator. Other inputs of a second decoder are connected to outputs of a reversible counter whose add and subtract inputs are connected to outputs of a control unit. Each of the main outputs of said second decoder, whose number is equal to the number of the converter's phases, are electrically coupled to a control electrode of a switching thyristor of a respective phase of the converter; and each of the main outputs of the first decoder, whose number is equal to the number of the converter's phases, is electrically coupled to a control electrode of a main thyristor of the same phase of the converter. The device further includes, in accordance with the invention and a NOT gate, an OR gate having all of its inputs connected to an emergency output of a respective phase of the converter, an output of said OR gate being connected to an input of said NOT gate. The recalculation units, are each intended to electrically connect the outputs of a respective decoder to the control electrodes of the respective thyristors of the converter. Each decoder has auxiliary outputs alternating with the main outputs, the number of auxiliary outputs being one less than the number of main outputs. Each of the recalculation units comprises main AND gates, the number of which is equal to the number of phases of the converter their first inputs being connected to an output of the NOT gate, the second inputs of said AND gates being connected to a respective main output of the respective decoder, and an output of each of said AND gates being connected to the control electrodes of a respective thyristor of the respective phase of the converter. Emergency AND gates are divided into groups whose number is equal to the number of phases of the converter, the number of said emergency AND gates in each group being equal to the number of auxiliary outputs of the respective decoder, a first input of each of said AND gates in each of the groups being connected to a respective auxiliary output of the respective decoder, the second inputs of all the emergency AND gates being connected to an emergency output of the respective phase of the converter, and the control electrode of the respective thyristor of each of the remaining phases of the converter being connected to the output of the respective emergency AND gate of the group.

BRIEF DESCRIPTION OF THE DRAWINGS

Other objects and advantages of the present invention will become more apparent from the following detailed description of a preferred embodiment thereof to be read in conjunction with the accompanying drawings, wherein:

FIGS. 3a-3f are graphs illustrating processes underway in the elements of the converter with all its phases in operation, in accordance with the invention; and FIGS. 4a-4e are graphs illustrating processes underway in the elements of the converter when operating in emergency conditions, with its second phase rendered inoperative, in accordance with the invention.

DETAILED DESCRIPTION OF THE INVENTION

Figure 1:
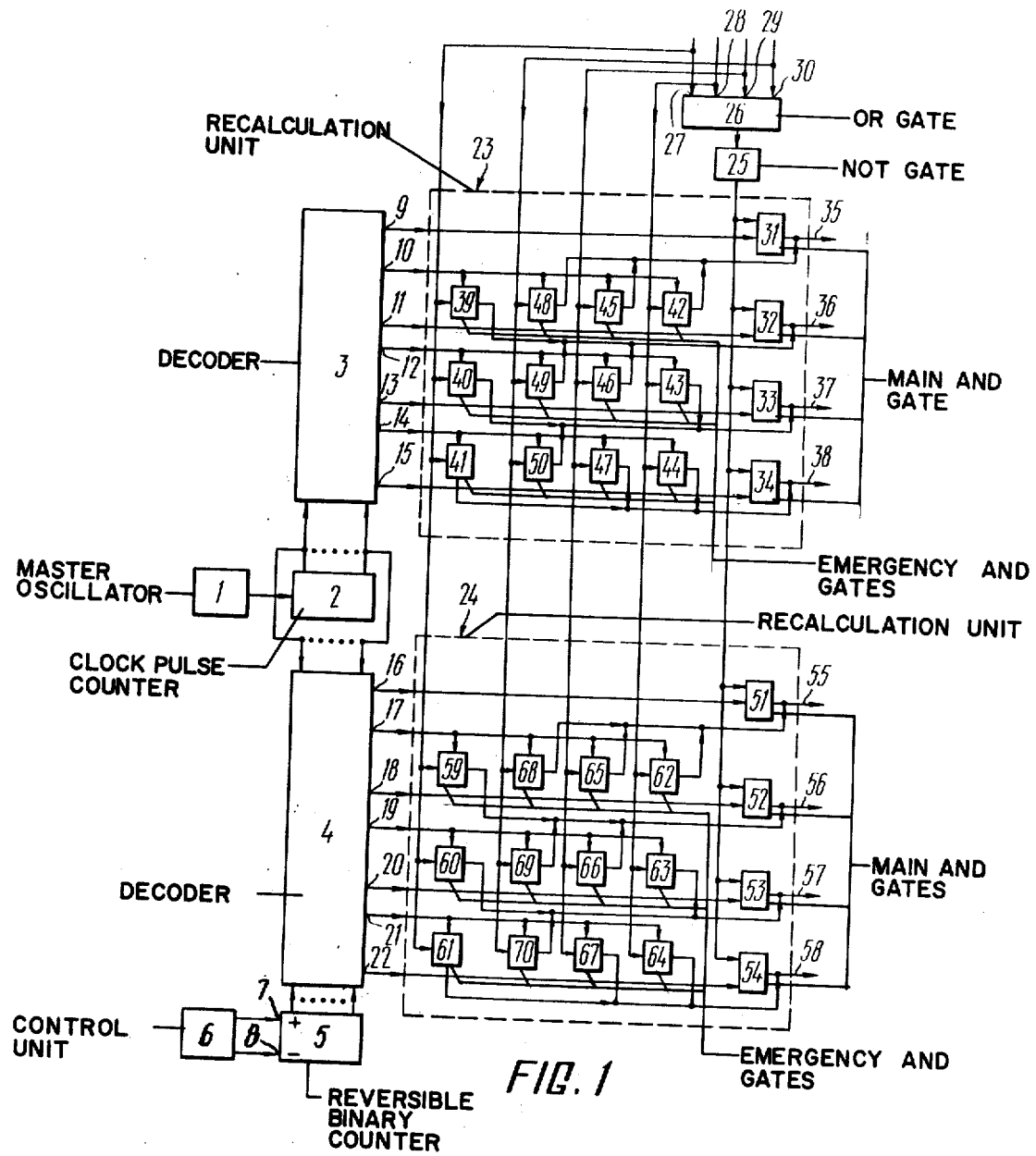
FIG. 1 is a block diagram of a digital control device for controlling a multiphase thyristor-pulse d.c. converter, in accordance with the invention.

Referring to the attached drawings, the proposed digital control device for controlling a multiphase (four-phase) thyristor- pulse d.c. converter comprises a master oscillator 1 (FIG.1) which is a multivibrator. An output of the master oscillator 1 is connected to an input of a clock pulse counter 2 which is a binary counter with a through carry of one. The number of outputs of the clock pulse counter 2 is double the number of flip-flops making up its circuit.

The device further includes decoders 3 and 4 whose inputs are connected to the outputs of the clock pulse counter 2; the device also includes a reversible binary counter 5 whose outputs are connected to other inputs of the decoder 4; the device still further includes a control unit 6 comprising pulse generators and feedback transducers.

Outputs of the control unit 6 are connected to an add input 7 and a subtract input 8 of the reversible counter 5.

The decoder 3 is a decoder matrix of the well-known type and has outputs 9, 10, 11, 12, 13, 14 and 15 of control pulses fixed in time.

The main outputs 9, 11, 13 and 15 of the decoder 3, whose number is equal to the number of phases of the controlled converter, are intended for time-fixed trains of pulses shifted in time with respect to one another by one-fourth of the pulse repetition period.

The auxiliary outputs 10, 12 and 14 of the decoder 3 alternate with the decoder's main outputs 9, 11, 13 and 15 and there is one less auxiliary output than there are main outputs 9, 11, 13 and 15. The auxiliary outputs 10, 12 and 14 are intended for time-fixed trains of pulses shifted in time with respect to one another by one-third of the pulse repetition period.

The decoder 4 is a through twin decoder matrix of the well-known type and has outputs 16, 17, 18, 19, 20, 21 and 22 of time-shiftable control pulses.

The main outputs 16, 18, 20 and 22 of the decoder 4, whose number is equal to the number of phases of the controlled converter, are intended for time-shiftable trains of pulses shifted in time with respect to one another by one-fourth of the pulse repetition period.

The auxiliary outputs 17, 19 and 21 of the decoder 4 alternate with the decoder's main outputs 16, 18, 20 and 22, and there is one auxiliary output than there are main outputs 16, 18, 20 and 22. The auxiliary outputs 17, 19 and 21 are intended for time-shiftable trains of pulses shifted in time with respect to one another by one-third of the pulse repetition period.

According to the invention, the proposed device further comprises two recalculation units 23 and 24.

The recalculation unit 23 is electrically interposed between the outputs 9, 10, 11, 12, 13, 14 and 15 and the control electrodes of main thyristors of all the controlled converter's phases.

The recalculation unit 24 is electrically interposed between the outputs 16, 17, 18, 19, 20, 21 and 22 and the control electrodes of switching thyristors of all the controlled converter's phases.

The device of this invention further includes a NOT gate 25 and an OR gate 26. Each of the inputs 27, 28, 29 and 30 of the OR gate 26 is connected to an emergency output of a respective phase of the converter. An output of the OR gate 26 is connected to an input of the NOT gate 25.

The recalculation unit 23 comprises main AND gates 31, 32, 33 and 34 whose number is equal to the number of phases of the controlled converter.

First inputs of all of the AND gates 31, 32, 33 and 34 are connected to an output of the NOT gate 25. A second input of each of the AND gates 31, 32, 33 and 34 is connected to a respective main output 9, 11, 13 or 15 of the decoder 3.

An output of each of the AND gates 31, 32, 33 and 34 is connected to a respective bus 35, 36, 37 or 38 connected to one of the control electrodes of the converter's main thyristors.

The recalculation unit 23 includes emergency AND gates 39, 40, 41, 42, 43, 44, 45, 46, 47, 48, 49 and 50 divided into groups whose number is equal to the number of phases of the controlled converter. The number of said emergency AND gates in each group is equal to the number of auxiliary outputs 10, 12 and 14 of the decoder 3.

A first input of each of the three AND gates 39, 40 and 41 of the first group is connected to a respective auxiliary output 10, 12 or 14. Second inputs of all the AND gates 39, 40 and 41 of this group are connected to an emergency output of the first phase of the converter, which emergency output is also connected to the input 27 of the OR gate 26. The output of each of the AND gates 39, 40 and 41 of this group is connected to a respective bus 36, 37 or 38 which are, in turn, connected to the controlled electrodes of the main thyristors of the converter's second, third and fourth phases, respectively.

A first input of each of a three AND gates 42, 43 and 44 of the second group is connected to the respective auxiliary output 10, 12 or 14 of the decoder 3. Second inputs of all the AND gates 42, 43 and 44 of the second group are connected to an emergency output of the converter's second phase, which emergency output is also connected to the input 28 of the OR gate 26.

The output of each of the AND gates 42, 43 and 44 of the second group is connected to a respective bus 35, 37 or 38 which are connected to the control electrodes of the main thyristors of the converter's first, third and fourth phases, respectively.

A first input of each of a three AND gates 45, 46 and 47 of the third group is connected to the respective auxiliary output 10, 12 or 14 of the decoder 3. Second outputs of all the AND gates 45, 46 and 47 of the third group are connected to an emergency output of the converter's third phase, which emergency output is also connected to the input 29 of the OR gate 26. The output of each of the AND gates 45, 46 and 47 of a third group is connected to the respective bus 35, 36 or 38 which are connected to the control electrodes of the main thyristors of the converter's first, second and fourth phases, respectively.

A first input of each of the three AND gates 48, 49 and 50 of the fourth group is connected to a respective auxiliary output 10, 12 or 14 of the decoder 3. Second inputs of all the AND gates 48, 49 and 50 of the fourth group are connected to an emergency output of the converter's fourth phase, which emergency output is also connected to the input 30 of the OR gate 26. The output of each of the AND gates 48, 49 and 50 of the fourth group is connected to a respective bus 35, 36 or 37 which are connected to the control electrodes of the main thyristors of the converter's first, second and third phases, respectively.

The recalculation unit 24 comprises main AND gates 51, 52, 53 and 54 in a number equal to the number of phases of the controlled converter.

First inputs of all the AND gates 51, 52, 53 and 54 are connected to the output of the NOT gate 25. A second input of each of the AND gates 51, 52, 53 and 54 is connected to a respective main output 16, 18, 20 or 22 of the decoder 4.

An output of each of the AND gates 51, 52, 53 and 54 is connected to a respective bus 55, 56, 57 or 58 which are connected to the control electrodes of the converter's switching thyristors.

The recalculation unit 24 includes emergency AND gates 59, 60, 61, 62, 63, 64, 65, 66, 67, 68, 69 and 70 divided into groups. The number of a groups is equal to the number of phases of the controlled converter. The number of AND gates in each group is equal to the number of auxiliary output 17, 19 and 21 of the decoder 4.

A first input of each of the three AND gates 59, 60 and 61 of the first group is connected to a respective auxilary output 17, 19 or 21. Second inputs of all the AND gates 59, 60 and 61 of the first group are connected to the emergency output of the first phase of the converter, which emergency output is also connected to the input 27 of the OR gate 26. The output of each of the AND gates 59, 60 and 61 of the first group is connected to a respective one of the buses 56, 57 or 58 which are connected to the control electrodes of the switching thyristors of the converter's second, third and fourth phases, respectively.

A first input of each of the three AND gates 62, 63 and 64 of the second group is connected to a respective auxiliary output 17, 19 or 21 of the decoder 4. Second inputs of all the AND gates 62, 63 and 64 of the second group are connected to the emergency output of the converter's second phase, which emergency output is also connected to the input 28 of the OR gate 26. The output of each of the AND gates 62, 63 and 64 of the second group is connected to a respective one of the buses 55, 57 or 58 which are connected to the control electrodes of the switching thyristors of the converter's first, third and fourth phases, respectively.

A first input of each of the three ANd gates 65, 66 and 67 of the third group is connected to a respective auxiliary output 17, 19 or 21 of the decoder 4. Second inputs of the AND gates 65, 66 and 67 of the third group are connected to the emergency output of the converter's third phase, which emergency output is also connected to the input 29 of the OR gate 26. The output of each of the AND gates 65, 66 and 67 of the third group is connected to a respective one of the buses 55, 56 or 58 which are connected to the control electrodes of the switching thyristors of the converter's first, second and fourth phases, respectively.

A first input of each of the three AND gates 68, 69 and 70 of the fourth group is connected to a respective auxiliary output 17, 19 or 21 of the decoder 4. Second inputs of the AND gates 68, 69 and 70 of the fourth group are connected to the emergency output of the converter's fourth phase, which emergency output is also connected to the input 30 of the OR gate 26. The output of each of the AND gates 68, 69 and 70 of the fourth group is connected to a respective one of the buses 55, 56 or 57 which are connected to the control electrodes of the switching thyristors of the converter's first, second and third phases, respectively.

The controlled multiphase thyristor-pulse d.c. converter comprises four phases I (FIG. 2), II, III and IV.

The first phase I comprises a main thyristor 71 whose control electrode is connected to the bus 35. The main thyristor 71 is shunted by a reactor 72 and a diode 73 which are placed in series. The first phase I further includes a switching thyristor 74 whose control electrodes is connected to the bus 55. The switching thyristor 74 is shunted by a reactor 75 and a diode 76 which are placed in series. The phase I further includes a switching capacitor 77, a diode 78 and a reactor 79, as well as a protection element 80 whose emergency output is connected to the input 27 of the OR gate 26 (FIG. 1).

The second phase II (FIG. 2) comprises a main thyristor 81 whose control electrode is connected to the bus 36. The main thyristor 81 is shunted by a reactor 82 and a diode 83 which are placed in series. The second phase II further includes a switching thyristor 84 whose control electrode is connected to the bus 56. The switching thyristor 84 is shunted by a reactor 85 and a diode 86 which are placed in series. The second phase II further includes a switching capacitor 87, a diode 88 and a reactor 89, as well as a protection element 90 whose emergency output is connected to the input 28 of the OR gate 26 (FIG. 1).

The third phase III (FIG. 2) of the converter comprises a main thyristor 91 whose control electrode is connected to the bus 37. The main thyristor 91 is shunted by a reactor 92 and a diode 93 which are placed in series. The phase III further includes a switching thyristor 94 whose control electrode is connected to the bus 57. The switching thyristor 94 is shunted by a reactor 95 and a diode 96 which are placed in series. The phase III further includes a switching capacitor 97, a diode 98 and a reactor 99, as well as a protection element 100 whose emergency output is connected to the input 29 of the OR gate 26 (FIG. 1).

The fourth phase IV (FIG. 2) of the converter comprises a main thyristor 101 whose control electrode is connected to the bus 38. The main thyristor 101 is shunted by a reactor 102 and a diode 103 which are placed in series. The phase IV further includes a switching thyristor 104 whose control electrode is connected to the bus 58. The switching thyristor 104 is shunted by a reactor 105 and a diode 106 which are placed in series. The phase IV further includes a switching capacitor 107, a diode 108 and a reactor 109, as well as a protection element 110 whose emergency output is connected to the input 30 of the OR gate 26 (FIG. 1).

A load 111 (FIG. 2) of the converter is composed of traction motors or commercial drive motors.

The phases I, II, III and IV and the load 111 are electrically interposed between the poles of a power source.

Figure 2:
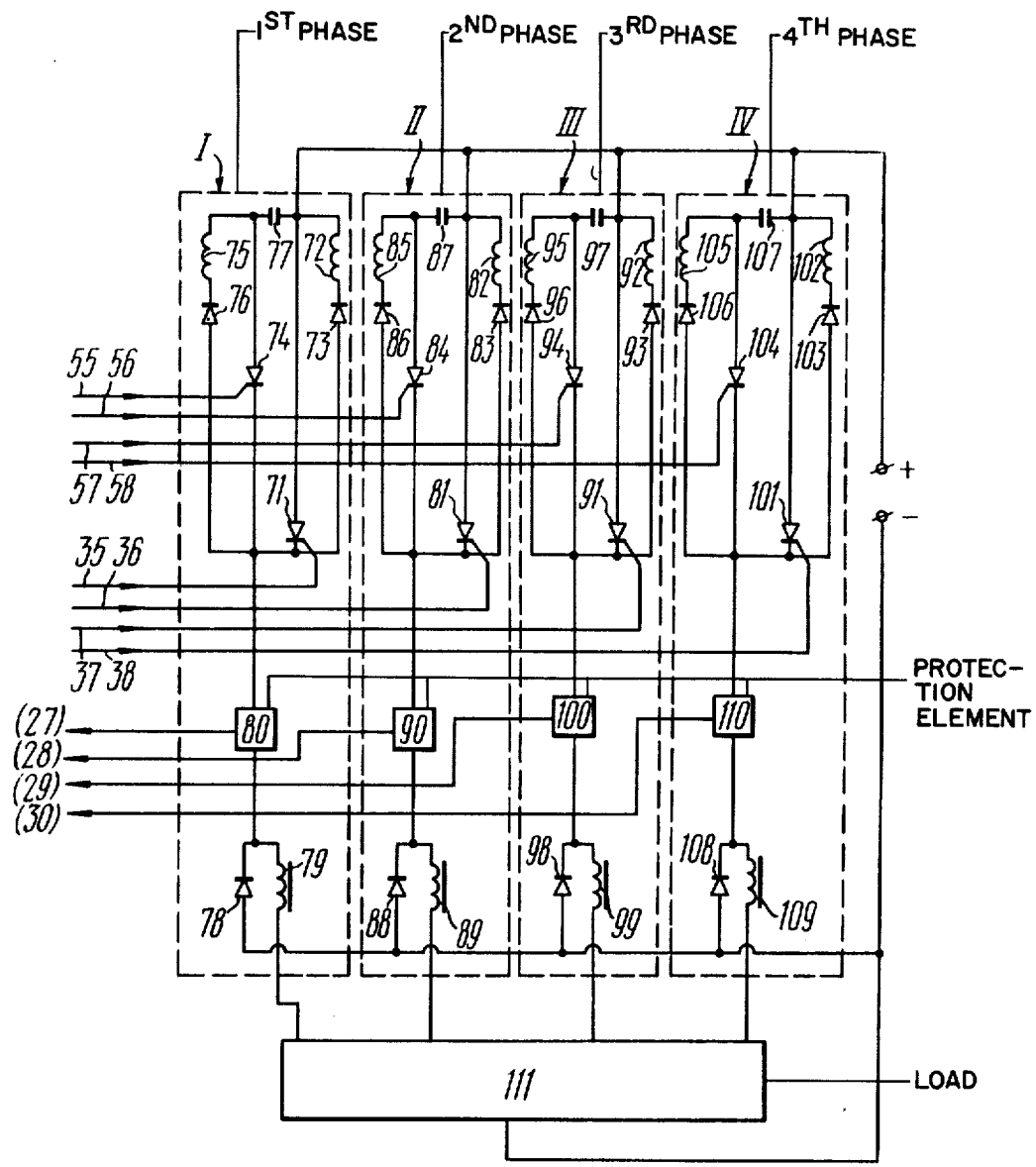
FIG. 2 is a diagram of a controlled four-phase thyristor-pulse d.c. converter in accordance with the invention.

FIG. 3 is a set of time plots illustrating processes underway in the converter's elements when all of the phases I, II, III and IV are in operation:

FIG. 3a shows pulses 112, 113, 114, 115, 116, 117, 118, 119 and 120 successively applied to the control electrodes of the thyristors 71 (FIG. 2), 74, 81, 84, 91, 94, 101, 104 and 71, respectively;

FIG. 3b shows the voltage $U_I$ (FIG. 3) across the load 111 (FIG. 2) during operation of phase I of the converter;

FIG. 3c shows the voltage $U_{II}$ (FIG. 3) across the load 111 (FIG. 2) during operation of phase II of the converter;

FIG. 3d shows the voltage $U_{III}$ (FIG. 3) across the load 111 (FIG. 2) during operation of phase III of the converter;

FIG. 3e shows the voltage $U_{IV}$ (FIG. 3) across the load 111 (FIG. 2) during operation of phase IV of the converter; and FIG. 3f shows the current i (FIG. 3) through the load 111 (FIG. 2).

FIG. 4 is a set of time plots illustrating processes underway in the converter's elements when only its phases I, III and IV are in operation:

FIG. 4a shows pulses 121, 122, 123, 124, 125, 126 and 127 successively applied to the control electrodes of the thyristors 71 (FIG. 2), 74, 91, 94, 101, 104 and 71, respectively;

FIG. 4b shows the voltage $U_I$ (FIG. 4) across the load 111 (FIG. 2) during operation of phase I of the converter;

FIG. 4c shows the voltage $U_{III}$ (FIG. 4) across the load 111 (FIG. 2) during operation of phase III of the converter;

FIG. 4d shows the voltage $U_{IV}$ (FIG. 4) across the load 111 (FIG. 2) during operation of phase IV of the converter; and FIG. 4e shows the current i (FIG. 4) through the load 111 (FIG. 2).

The proposed digital control device for controlling a multiphase thyristor-pulse d.c. converter operates as follows.

As pulses are applied from the output of the master oscillator 1 (FIG. 1) to the input of the clock pulse counter 2, the counter's flip-flops change their states, so coded information is applied to the inputs of the decoder 3. At the main outputs 9, 11, 13 and 15 of the coder 3 there are produced time-fixed trains of pulses which are shifted in time with respect to one another by one-fourth of the pulse repetition period. At the auxiliary outputs 10, 12 and 14 of the decoder 3 there are produced time-fixed trains of pulses which are shifted in time with respect to one another by one-third of the pulse repetition period.

Simultaneously, as pulses are applied from the output of the control unit 6 to the add input 7 of the reversible counter 5, the counter's flip-flops change their states. When the states of the flip-flops of the clock pulse counter 2 and the reversible counter 5 coincide, at the main outputs 16, 18, 20 and 22 of the decoder 4 there are produced time-shiftable trains of pulses shifted in time with respect to one another by one-fourth of the pulse repetition period.

These pulse trains are shifted in time relative to the respective time-fixed pulse trains, arriving from the main outputs 9, 11, 13 and 15 of the decoder 3, by a time interval $$\tau = T/2^n.$$

which takes place upon the arrival of each pulse at the inputs 7 or 8 of the reversible counter 5; in the above equation, T is the pulse repetition period; and n is the digit capacity of the clock pulse counter 2 and the reversible counter 5.

At the auxiliary outputs 17, 19 and 21 of the decoder 4 there are produced time-shiftable trains of pulses shifted in time with respect to one another by one-third of the pulse repetition period.

Upon the arrival of each pulse at the inputs 7 or 8 of the reversible counter 5, these pulse trains are shifted in time relative to the respective time-fixed pulse trains, arriving from the auxiliary outputs 10, 12 and 14 of the decoder 3, by the same time interval $\tau$.

As no signals are applied from the emergency outputs of the converter's phases to the inputs 27, 28, 29 and 30 of the OR gate 26, at the output of the NOT gate 25 there is produced a signal which is applied to the first inputs of all the main AND gates 31, 32, 33 and 34 of the recalculation unit 23 and all the main AND gates 51, 52, 53 and 54 of the recalculation unit 24.

The pulse 112 (FIG. 3, plot a), produced at the main output 9 (FIG. 1) of the decoder 3, is passed via the main AND gate 31 and the bus 35 to the control electrode of the main thyristor 71 (FIG. 2) of the converter's phase I. The thyristor 71 is driven into conduction and, as it conducts current, voltage $U_o$ (FIG. 3, plot b) of the power source is applied to the load 111.

The current i through the load 111 (FIG. 2) increases from $i_{min}$ (FIG. 3, plot f) to $i_{max}$.

After a time interval during which the main thyristor 71 (FIG. 2) conducts current, which period is equal to the product of the time interval $\tau$ and the number of pulses applied from the output of the control unit 6 (FIG. 1) to the add input 7 of the reversible counter 5, at the main output 16 of the decoder 4 there is produced the next pulse 113 which is shifted in time with respect to the pulse 112 (FIG. 3, plot a) and is applied via the main AND gate 51 (FIG. 1) and the bus 55 to the control electrode of the switching thyristor 74 (FIG. 2) of the converter's phase I. The thyristor 74 is driven into conduction, and the inverse voltage of the switching capacitor 77 is applied to the main thyristor 71, whereby the thyristor 71 is rendered non-conducting.

As the main thyristor 71 is non-conducting, the current i (FIG. 3, plot f) through the load 111 (FIG. 2) is maintained through the diode 78 and decreases from $i_{max}$ (FIG. 3, plot f) to $i_{min}$.

The next pulse 114 (FIG. 3, plot a), produced one-fourth of the pulse repetition period after the arrival of the pulse 112, is applied from the main output 11 (FIG. 1) of the decoder 3 via the AND gate 32 and the bus 36 to the control electrode of the main thyristor 81 (FIG. 2) of the converter's phase II. In the case of phase II, as well as of phases III and IV, the sequence of events is as the one described above.

After certain periods of time, the next pulses 115 (FIG. 3, plot a), 116, 117, 118, 119 and 120 are applied in this order from the main outputs 18 (FIG. 1), 13, 20, 15, 22 and 9 of the decoders 4 and 3 to the control electrodes of the thyristors 84 (FIG. 2), 91, 94, 101, 104 and 71, respectively.

Consider operation of the proposed digital control device for controlling a thyristor-pulse d.c. converter under emergency conditions.

Let it be assumed that the phase II of the converter is rendered inoperative and disconnected by the protection element 90. From the emergency output of the protection element 90 to the input 28 (FIG. 1) of the OR gate 26 there is applied a signal, whereby a signal is produced at the output of said OR gate 26, and the signal is discontinued at the output of the NOT gate 25.

At the same time the signals are discontinued at the first inputs of the main AND gates 31, 32, 33, 34, 51, 52, 53 and 54 of the recalculation units 23 and 24.

Simultaneously, the signal from the emergency output of the protection element 90 is applied to the second inputs of the emergency AND gates 42, 43, 44, 62, 63 and 64 of the second group.

As a result, the pulses produced at the main outputs 9, 11, 13 and 15 of the decoder 3 and the pulses produced at the main outputs 16, 18, 20 and 22 of the decoder 4 are shifted in time by one-fourth of the pulse repetition period and cannot reach the control electrodes of the converter's thyristors.

The pulse 121 (FIG. 4, plot a), produced at the auxiliary output 10 (FIG. 1) of the decoder 3, is applied via the emergency AND gate 42 and the bus 35 to the control electrode of the main thyristor 71 (FIG. 2) of the converter's phase I. The thyristor 71 is driven into conduction and, as it conducts current, voltage $U_o$ (FIG. 4, plot b) of the power source is applied to the load 111.

The current i through the load 111 (FIG. 2) increases from $i_{min}$ (FIG. 4, plot e) to $i_{max}$.

Following a time interval during which the main thyristor 71 (FIG. 2) conducts current, which time interval is equal to the product of the time interval $\tau$ and the number of pulses applied from the output of the control unit 6 (FIG. 1) to the add input 7 of the reversible counter 5, at the auxiliary output 17 (FIG. 1) of the decoder 4 there is produced the next pulse 122 which is shifted in time with respect to the pulse 121 (FIG. 4, plot a) and is applied via the emergency AND gate 62 (FIG. 1) and the bus 55 to the control electrode of the switching thyristor 74 (FIG. 2) of the converter's phase I. The thyristor 74 is driven into conduction, and the inverse voltage of the switching capacitor 77 is applied to the main thyristor 71, whereby the thyristor 71 is rendered non-conducting.

As the main thyristor 71 remains non-conducting, the current i (FIG. 4, plot e) through the load 111 (FIG. 2) is maintained via the diode 78 and decreases from $i_{max}$ (FIG. 4, plot e) to $i_{min}$.

The next pulse 123 (FIG. 4, plot a), produced one-third of the pulse repetition period after the arrival of the pulse 121, is applied from the auxiliary output 12 (FIG. 1) of the decoder 3 via the emergency AND gate 43 and the bus 37 to the control electrode of the main thyristor 91 (FIG. 2) of the converter's phase III.

The thyristor 91 is driven into conduction and, as it conducts current, voltage $U_o$ (FIG. 4, plot c) of the power source is applied to the load 111.

The current i through the load 111 (FIG. 2) increases from $i_{min}$ (FIG. 4, plot e) to $i_{max}$.

After a time interval during which the main thyristor 91 (FIG. 2) conducts current, which time interval is determined as those mentioned above, at the auxiliary output 19 (FIG. 1) of the decoder 4 there is produced the next phase 124 which is shifted in time with respect to the pulse 123 (FIG. 4, plot a) and is applied via the emergency AND gate 63 (FIG. 1) and the bus 57 to the control electrode of the switching thyristor 94 (FIG. 2) of the converter's phase III.

The thyristor 94 is driven into conduction, and the main thyristor 91 of the phase III is rendered non-conducting.

As the main thyristor 91 remains non-conducting the current i (FIG. 4, plot e) through the load 111 (FIG. 2) is maintained via the diode 98 and decreases from $i_{max}$ (FIG. 4, plot e) to $i_{min}$.

The next pulse 125 (FIG. 4, plot a), produced one-third of the pulse repetition period after the arrival of the pulse 123, is applied from the auxiliary output 14 (FIG. 1) of the decoder 3 via the emergency AND gate 44 and the bus 38 to the control electrode of the main thyristor 101 (FIG. 2) of the converter's phase IV.

The thyristor 101 is driven into conduction and, as it conducts current, voltage $U_o$ (FIG. 4, plot d) of the power source is applied to the load 111.

The current i through the load 111 (FIG. 2) increases from $i_{min}$ (FIG. 4, plot e) to $i_{max}$.

After a time interval during which the main thyristor 101 conducts current, whose duration is determined as described above, at the auxiliary output 21 (FIG. 1) of the decoder 4 there is produced the pulse 126 which is shifted in time with respect to the pulse 125 (FIG. 4, plot a) and is applied via the emergency AND gate 64 (FIG. 1) and the bus 58 to the control electrode of the switching thyristor 104 (FIG. 2) of the converter's phase IV.

The thyristor 104 is driven into conduction, and the main thyristor 101 of the phase IV is rendered non-conducting.

As the main thyristor 101 does not conduct current, the current i (FIG. 4, plot e) through the load 111 (FIG. 2) is maintained via the diode 108 and decreases from $i_{max}$ (FIG. 4, plot e) to $i_{min}$.

Finally, the pulse 127 (FIG. 4, plot a), producted one-third of the pulse repetition period after the arrival of the pulse 125 and a whole period after the arrival of the first pulse 121 under the emergency conditions, is again applied from the auxiliary output 10 (FIG. 1) of the decoder 3 via the emergency AND gate 42 and the bus 35 to the control electrode of the main thyristor 71 (FIG. 2) of the converter's phase I, whereupon the foregoing sequence of events is repeated.

Thus if one of the phases, for example, the phase II, is rendered inoperative, the proposed control device automatically recalculates the time interval between the instants the thyristors 71, 91 and 101 and 74, 94 and 104 of the phases I, III and IV are driven into conduction so as to make that time interval equal to one-third of the pulse repetition period.

If the phase I fails, the sequence of events that follow is similar to the one considered above. The difference is that pulses from the auxiliary outputs 10 (FIG. 1), 12, 14, 17, 19 and 21 of the decoders 3 and 4 are applied to the buses 36, 37, 38, 56, 57 and 58, respectively, via the emergency AND gates 39, 40, 41, 59, 60 and 61 of the first group. If the phase III (FIG. 2) fails, pulses are applied to the buses 35 (FIG. 1), 36, 38, 55, 56 and 58, respectively, via the emergency AND gates 45, 46, 47, 65, 66 and 67 of the third group; if the phase IV (FIG. 2) fails, pulses are applied to the buses 35 (FIG. 1), 36, 37, 55, 56 and 57, respectively, via the emergency AND gates 48, 49, 50, 68, 69 and 70 of the fourth group.

Without the above-mentioned automatic recalculation of the time interval between the instants the thyristors of operating phases are driven into conduction, the current i through the load 111 (FIG. 2) may decrease below the permissible minimum value $i_{min}$ (FIG. 3, plot f), as shown by curve A; the absence of automatic recalculation may also result in intermittent currents (curve B).

The device of the present invention eliminates such undesired phenomena and makes it possible, while operating in emergency conditions, to maintain normal operating conditions of electrical machines and of the power source of the thyristor-pulse d.c. converter. The proposed device also provides for the required harmonic content of the power source's current.

What is claimed is:

1. A digital control device controlling a multiphase thyristor-pulse d.c. converter and comprising:
   a master oscillator;
   a clock pulse counter having an input connected to an output of said master oscillator, and outputs;
   a control unit;

a reversible counter having add and subtract inputs respectively connected to add and subtract outputs of said control unit, and outputs;

a first decoder having inputs connected to respective outputs of said clock pulse counter, main outputs equal in number to the number of phases of the converter, and auxiliary outputs alternating with said main outputs, the number of said auxiliary outputs being one less than the number of said main outputs;

a second decoder having inputs connected to respective outputs of said clock pulse counter and to respective outputs of said reversible counter, main outputs equal in number to the number of phases of the converter, and auxiliary outputs alternating with said main outputs, the number of said auxiliary outputs being one less than the number of said main outputs;

a NOT gate having an input and an output;

an OR gate having inputs connected to an emergency output of a respective phase of the converter, and an output connected to said input of said NOT gate;

a first recalculation unit including main AND gates and emergency AND gates;

said main AND gates of said first recalculation unit being equal in number to the number of phases of the converter, each main AND gate having a first input connected to said output of said NOT gate, a second input connected to a respective main output of said first decoder, and an output connected to a control electrode of a main thyristor of a respective phase of the converter;

said emergency AND gates of said first recalculation unit being divided into groups whose number is equal to the number of phases of the converter, the number of said emergency AND gates in each group being equal to the number of auxiliary outputs of said first decoder, each emergency AND gate having a first input connected to a respective auxiliary output of said first decoder, a second input connected to said emergency output of a respective phase of the converter, the control electrode of a main thyristor of one of the other phases of the converter being connected to an output of a respective emergency AND gate of a respective group;

a second recalculation unit including main AND gates and emergency AND gates;

said main AND gates of said second recalculation unit being equal in number to the number of phases of the converter, each main AND gate having a first input connected to the output of said NOT gate, a second input connected to a respective main output of said second decoder, and an output connected to a control electrode of a switching thyristor of a respective phase of the converter; and said emergency AND gates of said second recalculation unit being divided into groups whose number is equal to the number of phases of the converter, the number of said emergency AND gates in each group being equal to the number of auxiliary outputs of said second decoder, each emergency AND gate having a first input connected to a respective auxiliary output of said second decoder, a second input connected to said emergency output of a respective phase of the converter, the control electrode of a switching thyristor of one of the other phases of the converter being connected to an output of a respective emergency AND gate of a respective group.

* * * * *